United States Patent [19]

Spangler et al.

[11] Patent Number: 4,593,430
[45] Date of Patent: Jun. 10, 1986

[54] QUICK CONNECT FITTING FOR A FAUCET HANDLE AND THE LIKE

[75] Inventors: Anthony G. Spangler, Westfield; Kenneth E. Myers, Indianapolis, both of Ind.

[73] Assignee: Masco Corporation of Indiana, Taylor, Mich.

[21] Appl. No.: 445,490

[22] Filed: Nov. 30, 1982

[51] Int. Cl.$^4$ ............................................. B25G 3/28
[52] U.S. Cl. .................................. 16/121; 16/114 R; 16/DIG. 24; 16/DIG. 30; 16/DIG. 40; 16/DIG. 41
[58] Field of Search ........ 16/121, DIG. 30, DIG. 40, 16/DIG. 41, 118, 114 R; 137/315; 403/10, 7, 349, 24, 11, 329, 359, 330, 361; 215/223, 224, 200, 287, 301, 318, 100 A, 222; 74/543, 548, 553, 556, 558.5, 545, 551.8

[56] References Cited

U.S. PATENT DOCUMENTS

| 1,982,011 | 11/1934 | Michel | 403/24 |
|---|---|---|---|
| 2,672,764 | 3/1954 | Bedford, Jr. | 16/121 |
| 2,801,118 | 7/1957 | Amesbury | 74/543 X |
| 3,001,551 | 9/1961 | Wyser | 137/635 |
| 3,010,743 | 11/1961 | Bengston, Jr. | 403/10 |
| 3,329,452 | 7/1967 | Ammon | 403/361 |
| 3,396,604 | 8/1968 | Samuels et al. | 16/DIG. 30 |
| 3,481,360 | 12/1961 | Gillberg | 137/315 |
| 3,656,709 | 4/1961 | Shufflebarger et al. | 251/95 |
| 3,758,920 | 9/1973 | Debrjanskyj et al. | 16/121 |
| 3,860,136 | 1/1975 | Romney | 215/222 |
| 3,887,963 | 6/1975 | Harmon et al. | 16/121 |
| 3,965,529 | 6/1976 | Hadzimahalis | 16/121 |
| 3,991,427 | 11/1976 | Kemker | 4/192 |
| 4,037,489 | 7/1977 | Morel | 74/548 |
| 4,052,768 | 10/1977 | Yamazaki et al. | 16/121 |
| 4,101,989 | 7/1978 | Lagarelli | 4/191 |
| 4,161,891 | 7/1979 | Bassert | 74/543 |
| 4,189,248 | 2/1980 | Sully | 16/118 |
| 4,193,166 | 3/1980 | Neff | 16/121 |

FOREIGN PATENT DOCUMENTS 1385034 2/1975 United Kingdom ............... 215/224

Primary Examiner—Donald R. Schran
Assistant Examiner—James L. Wolfe
Attorney, Agent, or Firm—Steven L. Permut; Malcolm L. Sutherland; Leon E. Redman

[57] ABSTRACT

A handle assembly has a handle member secured to a stem by a fastener device which includes a coupler member secured to the end of the stem and snap fittingly engaged to an insert member which in turn is rigidly secured to the handle member. The coupler member has axially extending flanges with radially extending shoulders which engage a shoulder on the insert member. The shoulders of the insert and the coupler member have inclined surfaces that provide the handle to be connected onto the stem upon exertion of a force of predetermined magnitude in the axial direction. The coupler member and the insert member have a second pair of inclined surfaces which provide for disengagement of the insert member from the coupler member at a force of greater predetermined magnitude than the connecting force.

6 Claims, 8 Drawing Figures

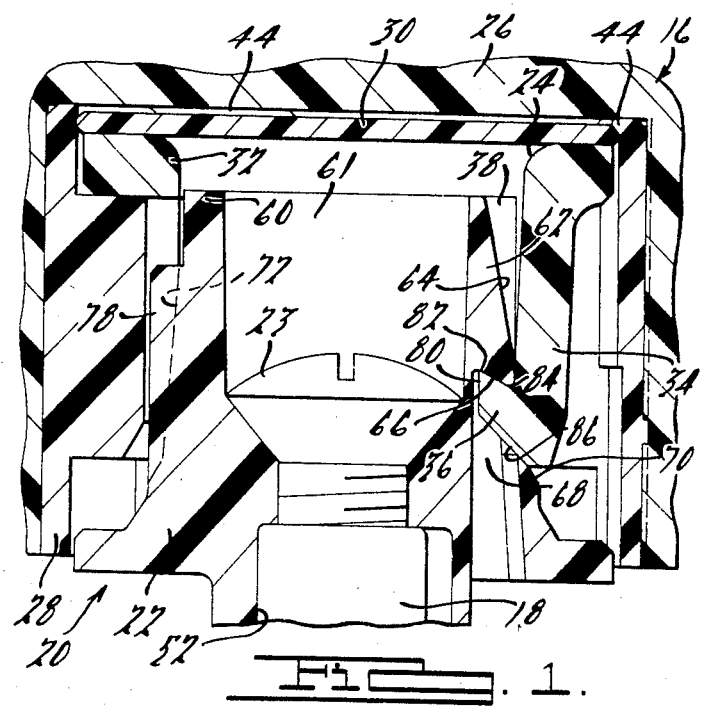
FIG. 1.
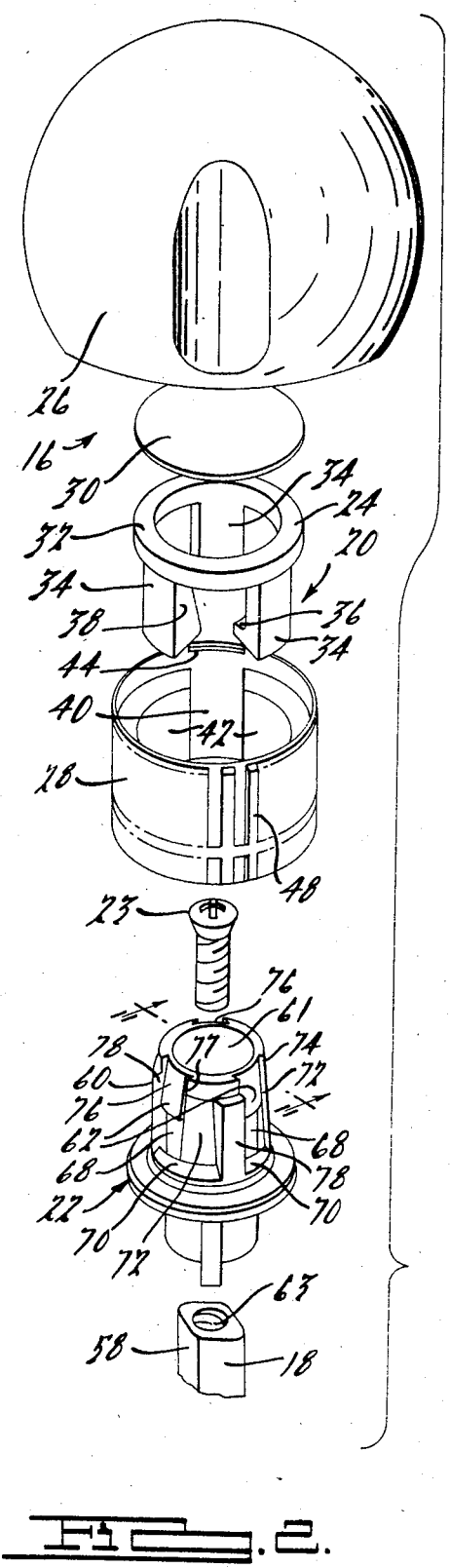
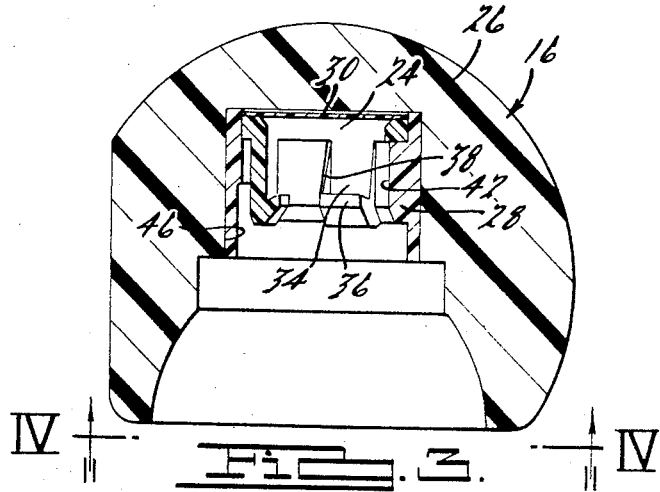
FIG. 3.
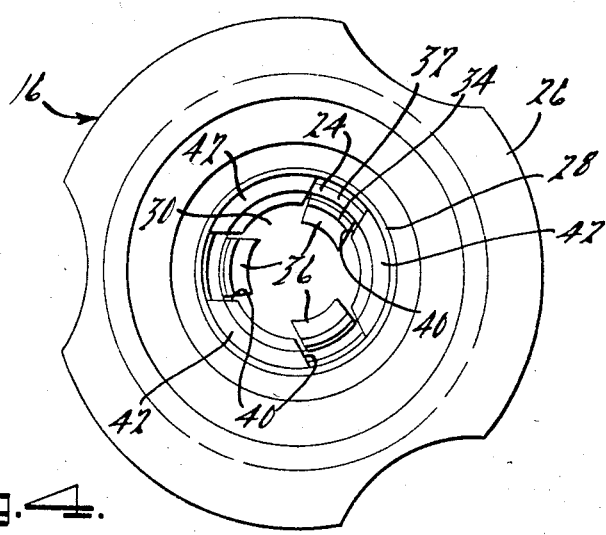
FIG. 2.
FIG. 4.

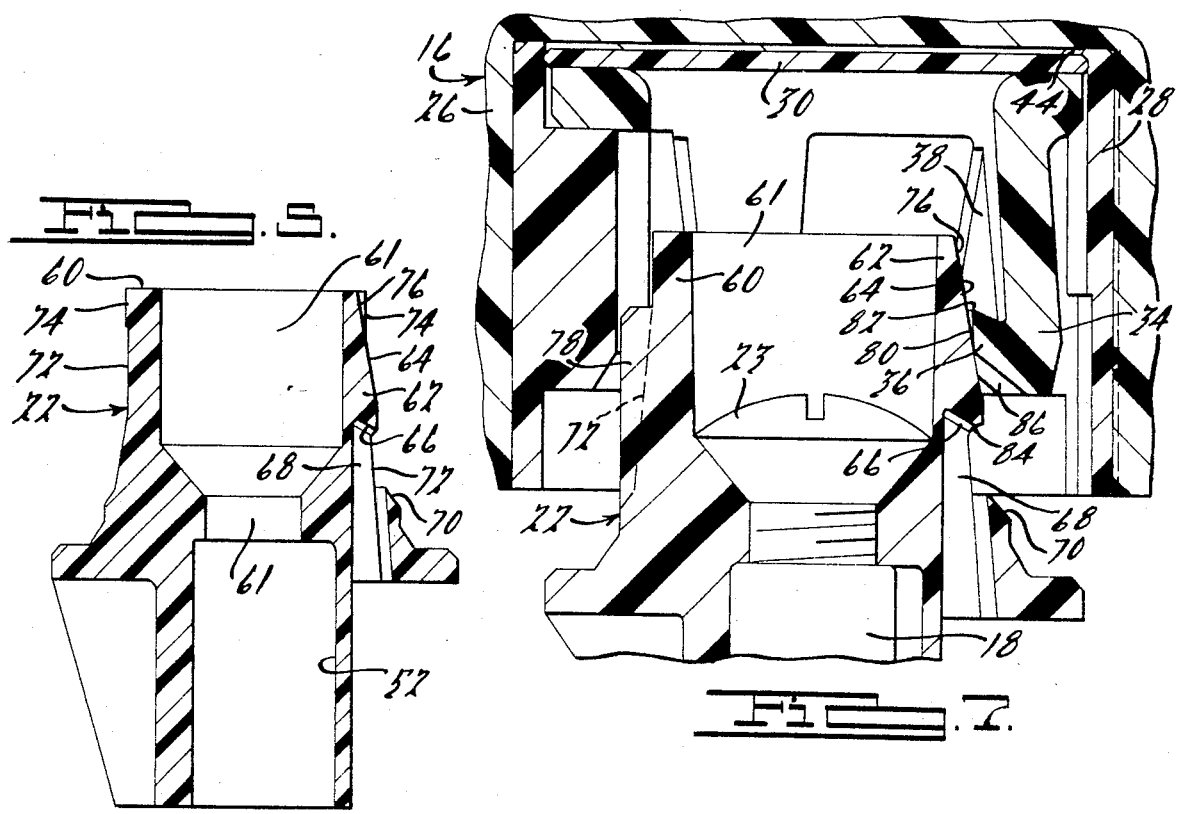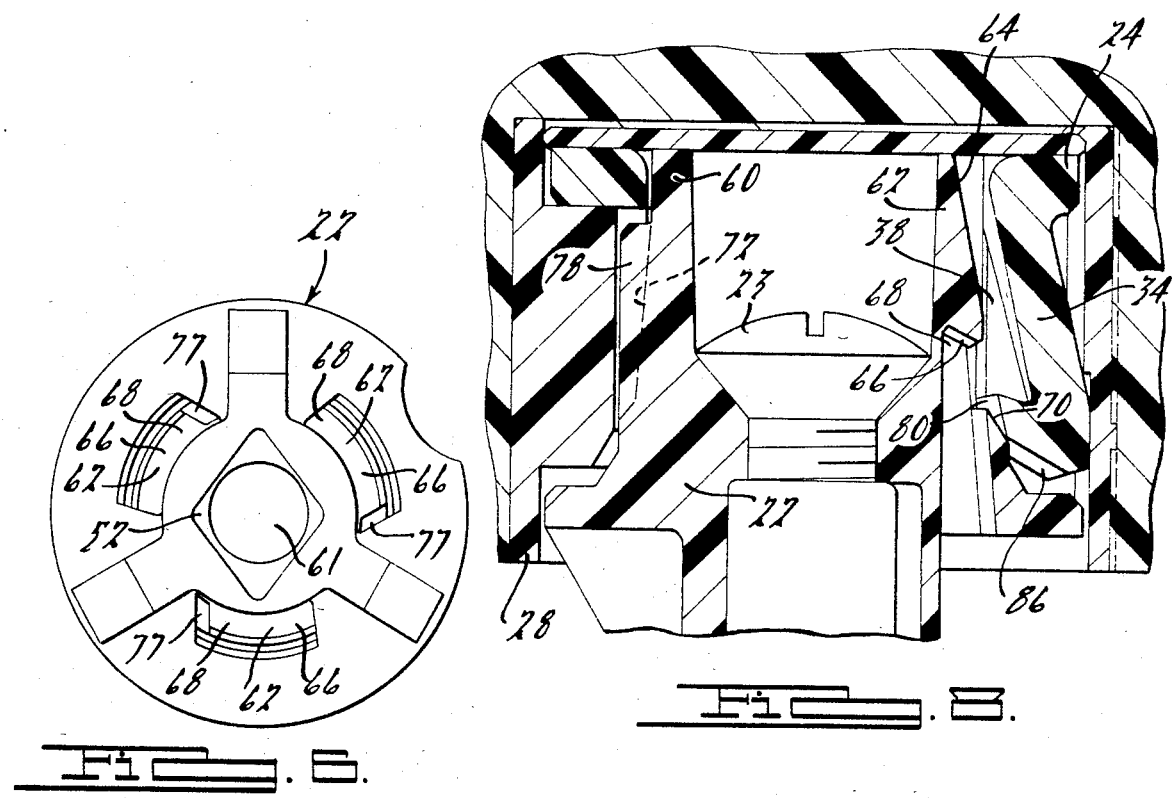

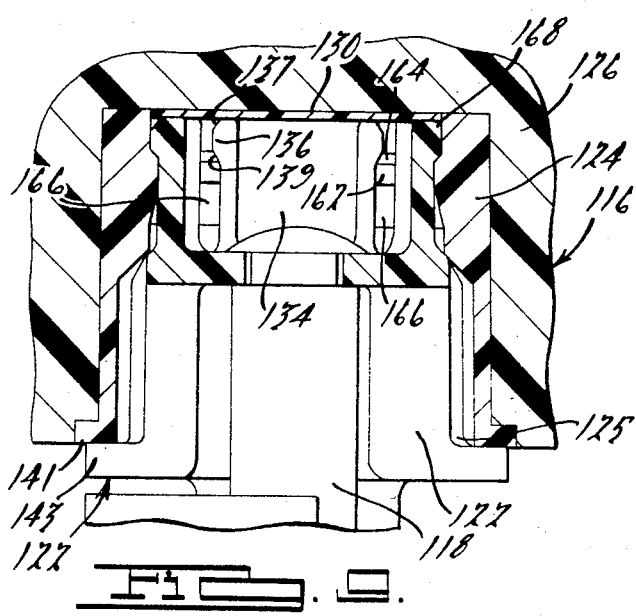
FIG. 9.
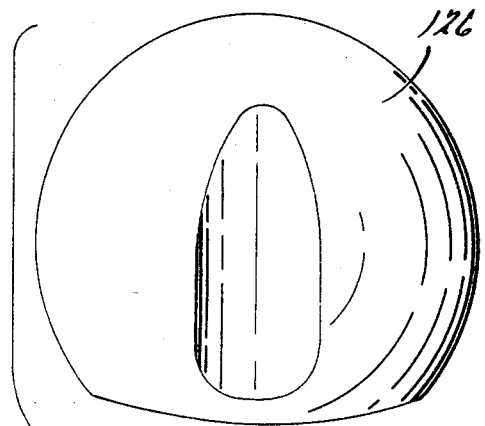
FIG. 10.
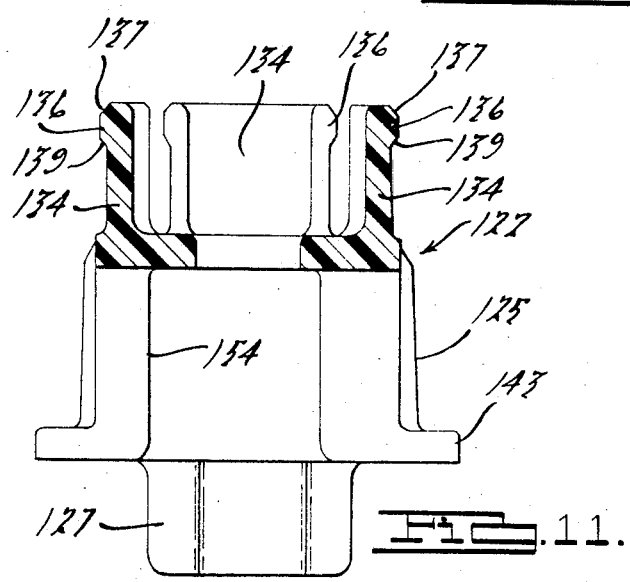
FIG. 11.
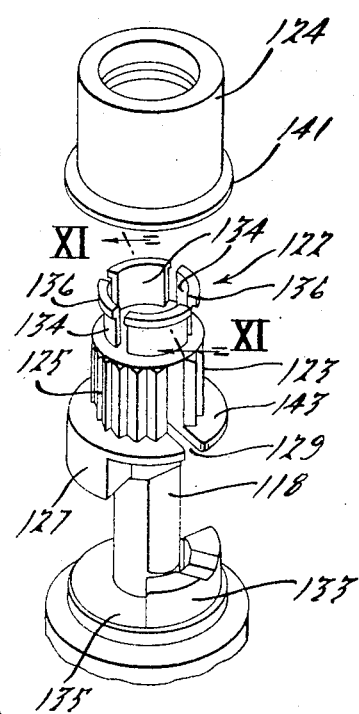
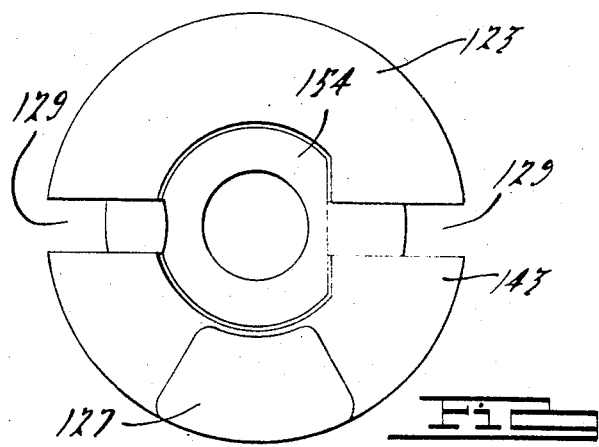
FIG. 12.
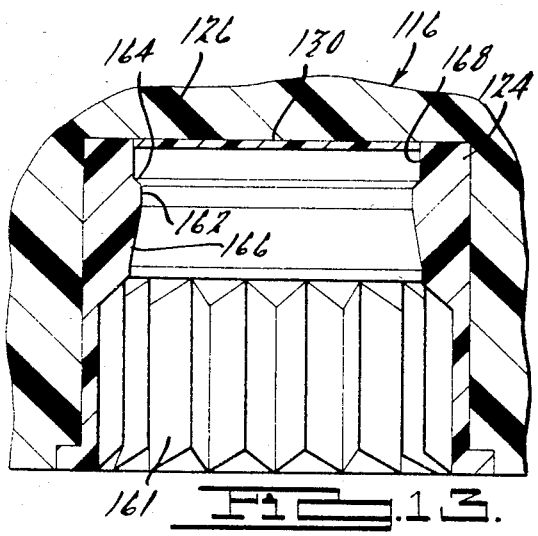
FIG. 13.

QUICK CONNECT FITTING FOR A FAUCET HANDLE AND THE LIKE

TECHNICAL FIELD

This invention relates to faucet handle assemblies, more particularly to a faucet handle assembly incorporating a concealed snap-on fastening device.

DISCLOSURE INFORMATION

Faucet handles commonly are designed for two purposes; first, to rotate a faucet stem, and second to conceal the faucet stem fastener. Commonly faucet handles are secured to the stem by a threaded fastener which has its head exposed in an upper portion of the handle. The head must be accessible for servicing of the faucet.

Decorative faucet handles that conceal the head have become extremely popular. Often, the decorative faucet handles have a separate cap snap fitted to the top of the handle to conceal the head. The cap often is designed to blend in with the handle member, i.e. the cap becomes unnoticeable. Faucet handles with many contours and recesses and a plurality of sharp angles are suitable for obscuring the distinction between the cap and the handle.

However, other designs which lack many convolutions and sharp angles are not suitable for obscuring the distinction between the cap member and the handle member. For decorative faucet handles of this particular nature, a cap can be as undesireable as an exposed head of the threaded fastener.

Previous attempts have been made to snap fit a handle onto a stem. Snap fit mechanisms are particularly common in environments which need no servicing. Snap fit mechanisms have also been constructed to facilitate removal of the handle member from the stem. For example, a slot through the handle allows insertion of a tool to disengage a hook member from the handle to allow removal of a handle from the stem. The slot, however, can deter from the aesthetic value of the handle design.

Snap fit faucet handles have been developed that facilitate removal of the handle. United States Patent application entitled A FASTENER DEVICE FOR A FAUCET HANDLE AND THE LIKE filed by inventors Charles P. Hill and Anthony G. Spangler on the same day as the present application provides for a handle which can be pulled off a coupler member upon a sufficiently great predetermined force.

What is needed is a snap fit mechanism for a handle assembly which facilitates removal from the handle without access to the snap fit assembly from the exterior side of the handle and deters unintentional removal of handle.

SUMMARY OF THE INVENTION

According to the invention, a faucet handle assembly includes a handle member removably secured to a faucet stem by means of a coupler member rigidly secured to the end of a rotatable stem and an insert member rigidly secured to the handle member. The insert member and coupler member are snap fitted together.

In one embodiment, the insert member is secured within a hole in the handle member. The insert member has resiliently flexible flanges extending axially downward. The free end of each flange has a radially inwardly extending shoulder for engagement with the coupler member. The coupler member has a plurality of shoulders extending radially outwardly in position to engage the shoulders of the flanges. The shoulders on the flanges and the coupler have complementary canted surfaces such that a predetermined axially directed force is necessary to connect the handle to the coupler member. Downward movement of the insert member onto the coupler member causes the flanges to resiliently flex outwardly as the shoulders of the flanges abut the shoulders of the coupler. Upon a predetermined amount of movement, the shoulders on the flanges become positioned below the shoulders of the coupler member and the flanges are free to flex back and radially move inward thereby positioning the shoulders on the flange in recess disposed below the shoulders on the coupler member. The handle is connected to the coupler member after the flanges flex back. The coupler member has ribs on each side of each engaging means recess for non-rotatably securing the shoulders of the insert.

For disconnecting the handle from the stem, the coupler member has a ramp member positioned below each recess to radially deflect the flanges outwardly upon a downwardly directed force on the handle member. Each rib has an outer facing wall surface which can abut the inside edge of a shoulder of a flange when the shoulder is deflected outwardly by the ramp member. The shoulders can slide upwardly against the walls past the recesses and shoulders of the coupler member.

In broader terms, the invention relates to a fastener device for a faucet handle. The fastener device includes a coupler member non-rotatably secured to an end of a rotatable stem. A handle member in turn is non-rotatably secured to the coupler member. A plurality of axially extending and resiliently flexible flanges extend from either the coupler member or the handle member. The flanges have radially extending shoulders. The other of the handle member or coupler member includes a receptor for receiving the shoulders and flanges. The receptor is constructed to secure the shoulders upon an axially directed force of a first predetermined magnitude to provide an axially and non-rotatably fixed connection between the handle and the stem. A disconnector facilitates disengagement of the shoulders from the receptor upon an axially downward directed force of substantially greater predetermined magnitude than the first predetermined magnitude and allows rotation of the shoulders about the coupler and engagement with a wall adjacent the receptor.

The invention provides for an aesthetically pleasing handle which conceals faucet stems without the use of exposed bolts or caps while maintaining the ability to service the stem.

BRIEF DESCRIPTION OF THE DRAWINGS

Reference now will be made to the accompanying drawings in which:

FIG. 1 is a side elevational segmented view of a faucet handle assembly illustrating one embodiment of the invention;

FIG. 2 is an exploded view illustrating the separate components of the faucet handle assembly shown in FIG. 1;

FIG. 3 is a cross-sectional view of the handle subassembly incorporating the handle member, cap, housing and insert member shown in FIG. 2;

FIG. 4 is a bottom plan view taken along the line IV—IV in FIG. 3;

FIG. 5 is an enlarged cross-sectional view of the coupler member taken along the line V—V in FIG. 2;

FIG. 6 is a bottom plan view of the coupler member;

FIG. 7 is a cross-sectional view of the handle assembly during the assembly process; and FIG. 8 is a cross-sectional view of the handle assembly during disconnection of the handle from the coupler member.

DETAILED DESCRIPTION OF THE PREFERRED EMBODIMENT

Referring specifically to FIGS. 1 and 2, a handle subassembly 16 is secured to the faucet stem 18 by a fastening device 20. The fastening device 20 includes a coupler member 22 secured to the stem by bolt 23 and an insert member 24 secured to a handle member 26 by means of a housing 28 and a cap 30. The insert member 24, housing 28, cap 30 and handle member 26 form the handle subassembly 16.

The insert member 24 has an upper annular rim 32 and three circumferentially spaced and axially downwardly extending flanges 34. Each flange 34 has an inwardly extending shoulder 36 at its lower end. In addition, each flange has at one edge thereof an inwardly extending wall member 38. Each flange and shoulder are arced, i.e. contoured, about a central axis. The insert member 24 is made from a resilient plastic material that allows the flanges to be resiliently flexible in the radial direction. For example, M90-04 Celcon TM by Celanese is a suitable material.

The insert member is received in the housing 28 as shown in FIGS. 1, 3 and 4. The housing has three channels 40 which are positioned and sized to receive the flanges 34. In addition, the housing 28 has three shoulder sections 42 which support the annular rim 32 of the insert 24. In addition, the housing has three smaller inwardly extending shoulders 44 at a top edge thereof to snap fittingly receive cap 30.

The housing 28, insert member 24, and cap 30 are rigidly secured within a hole 46 extending from the bottom of the handle member 26 to form handle subassembly 16. The handle member 26 may be molded about housing 28 or may be separately made with the housing later bonded within the hole 46. Housing 28 has exterior ribs 48 to promote a rigid connection between the housing 28 and handle member 26.

The coupler member 22, as shown in FIG. 1, is made from the same plastic material as insert member 24 and is secured to a diamond-shaped top end 58 of stem 18 by bolt 23. The coupler member is non-rotatably secured to the stem end 58 because diamond-shaped hole 52, as clearly shown in FIG. 6 at the bottom portion of the coupler member 22 snugly receives the diamond-shaped top end 58 of the stem 18. Bolt 23 passes through aperture 61 and threadably engages aperture 63 in stem 18.

An annular upper section 60 of coupler member 22, as shown in FIGS. 2, 5 and 6, defines the central aperture 61 which receives bolt 23. The section 60 has a plurality of shoulders 62 having an inclined upper surface 64 and a lower surface 66 forming a downwardly extending acute angle with respect to the longitudinal axis of the coupler member 22. Both surfaces 64 and 66 are arced about a central axis. The lower surface 66 forms the upper wall of a recess 68 which is sized to receive a shoulder 36 at the end of flange 34. Each recess 68 is bounded at a lower edge thereof by a ramp 70 having a more horizontal inclination than the upper surface 64 of shoulder 62. Each recess 68 and shoulder 62 is bounded at one side by a near vertical axially extending ramp 72 ending at a vertically extending surface 74. Interposed between the shoulder 62 and near vertical ramp 72 is a narrow channel 77 which is sized to receive wall member 38 of flange 34. The vertical surfaces 74 are positioned radially outwardly relative to the top of shoulder 62 such that a channel 76 is formed between two surfaces 74. The channel 76 is sized to receive the shoulder 36 of flange 34 on insert member 24. The opposite side of each shoulder 62 and recess 68 is bounded by a vertically extending ledge 78. The ledge 78 defines the opposite edge of each vertical ramp 72.

Referring to FIG. 7, assembly of the faucet handle subassembly 16 onto the stem 18 is now described. The handle subassembly 16 is placed over the coupler member 22. When the flanges 34 are in the unflexed position, the shoulders 36 at the end of flanges 34 are positioned radially inward from the vertical surfaces 74 of coupler 22. On the other hand, the channels 76 are axially beneath the flange 34 and are adapted to receive the inner edges 80 of shoulders 36 such that the flanges 34 become seated within the channel 76.

A downwardly directed force of predetermined magnitude is applied to the handle subassembly 16. The flanges 34 slide downward on the surface 64 and are flexed outwardly as the inner edges 80 of shoulders 36 ride down on the surfaces 64. When the upper edges 82 of shoulders 36 clear the lower edges 84 of the surfaces 64, the flanges 34 resiliently snap radially inwardly positioning the shoulders 36 within the recesses 68 as shown in FIG. 1. As the shoulder 36 radially moves inwardly, its beveled edge 86 abuts ramp 70 and moves slightly upwardly so that edge 82 is positioned higher than edge 84. The inclination of shoulder 36 and surface 66 provide a hook connection such that upward pull on the handle make the flanges grip more tightly onto the coupler member.

The handle subassembly 16 is now secured onto the stem 18 against relative rotation. The shoulder 36 and lower surface 66 of shoulder 62 prevent the insert 24 from being upwardly withdrawn. In addition, when the shoulders 36 are in the recess 68, each shoulder 36 also abuts ramp 70 which acts as a stop to prevent a undesireable downward movement of the handle subassembly 16 with respect to the coupler member 22.

If, however, the handle subassembly 16 is to be removed from the stem, a downwardly directed force on the handle subassembly 16 having a magnitude substantially greater than the force needed to attach the handle subassembly 16 onto the coupler member 22 causes the beveled edges 86 of shoulders 36 to ride downwardly upon the ramp 70 and radially flexes the flanges 34 outwardly. When the flanges 34 are flexed outwardly to a position shown in FIG. 8, the inner edge 80 of the shoulder 36 is now positioned radially outward relative to near vertical ramp 72. In addition, the wall 38 is disengaged from the narrow channel 77. Consequently, the handle member is free to rotatably turn on the coupler member 22 to align the flanges with the near vertical ramps 72. Once the flanges 34 are aligned with the ramps 72 and the downwardly directed force ceases, the flanges 34 resiliently flex inwardly against the ramp 72 thereby popping the handle subassembly 16 upwardly and disengaging the insert member 24 from the coupler member 22. The handle subassembly 16 is then free to be lifted off from the coupler member 22.

The procedure for disconnecting the handle is easy for any person. An operator merely pushes the handle downward, rotates it relative to the coupler member while the handle is pressed downward, and then lifts the handle upward. However, this procedure deters a person from unintentionally removing the handle from the stem. A deliberate action is needed to cause the removal of the handle.

The coupler member 22 can then be disengaged from the stem 18 if the faucet needs to be repaired or replaced. After the repair or replacement, the coupler member 22 can then be remounted onto the stem 18 and the handle subassembly 16 snap fitted back onto the coupler member 22.

In this fashion, a snap fit faucet handle assembly is provided which allows for easy assembly of a faucet handle onto the faucet stem while providing a means for removal of the faucet handle from the stem when so desired. The invention provides easy assembly and removal capabilities without having parts that are visible when the handle is in the installed position. The concealed snap fit fastening device provides for an aesthetically desireable handle with no visible bolt head, aperture, or cap.

Variations and modifications of the present invention are possible without departing from its scope and spirit as defined by the appended claims.

We claim:

1. A fastener device for a faucet handle comprising:
a coupler member non-rotatably secured to an end of an operable stem;
a handle member having a receptor means for receiving said coupler member;
said receptor means having axially extending and resiliently flexible flanges, each flange having a radially extending shoulder;
said coupler member having a plurality of recesses to receive a shoulder of each flange;
said coupler member having a radially extending shoulder means axially interposed between said recesses and a free end of said coupler member and positioned to flex said flange in a radial direction when said shoulder of each flange axially passes thereby;
said recesses bounded at each side by a rib having an outer surface and having edges that engage a respective shoulder of each flange to prevent said receptor means from rotating relative to said coupler when said shoulders are received in said recesses;
means for flexing said shoulders outwardly from said recesses upon a downwardly directed force such that said receptor means becomes free to rotate about said coupler member with said shoulders engaging an outer surface of said rib and being free to be upwardly moved past said recesses and shoulder means of said coupler member to disengage said receptor means from said coupler member; and
said outer surface of said rib positioned radially with respect to each flange to maintain said flange in a flexed position when said flange is engaged thereto.

2. A faucet handle comprising:
a coupler member non-rotatably secured to an end of a faucet stem;
a handle subassembly non-rotatably securable to said coupler member;
said handle subassembly includes a handle member having an opening at a lower end thereof, a housing member rigidly secured within the hole, and an insert member secured within the housing member;
said insert member having axially extending and resiliently flexible flanges extending through channels in said housing member, said flanges having radially inwardly extending shoulders;
said coupler member having a plurality of circumferentially spaced and radially inwardly extending recesses having an upper end bounded by a lower surface of radially outwardly extending shoulders and a lower end bounded by a canted ramp inclined radially outward and axially downward;
said recesses having their sides bounded by axially extending and circumferentially spaced ribs, each rib having an outer ramp section having a lower edge meeting an upper inner edge of said canted ramp; said ramp section radially positioned outwardly with respect to the flanges when in an unflexed position;
said circumferentially spaced ribs having upper ends positioned radially outward from an upper end of said shoulder of said coupler member to define channels therebetween;
said channels in said coupler member sized to receive said flanges;
said flange having radially inwardly extending shoulders which are deflected outwardly by said respective shoulders on said coupler member upon downward movement of said flanges relative to said coupler member;
said recesses sized to receive said radially inwardly extending shoulders when said flanges are moved sufficiently downward such that said radially inwardly extending shoulders are positioned below said radially outwardly extending shoulders and said flanges are free to radially inwardly flex back from an outward deflected position;
said radially inwardly extending shoulders constructed to abut said canted ramp and be moved outwardly upon a downwardly directed force on said handle member until said shoulders on said insert member are radially moved out of said recess and positioned radially outward from out of said recess and positioned radially outward from said outer facing ramps of said ribs;
said handle being rotatable with respect to said coupler member such that said radially inwardly extending shoulders are rotated to be aligned with and abut said outer facing ramps of said ribs; and
said ramps of said ribs providing an unobstructed path as said radially inwardly extending shoulders move upwardly past and adjacent to said recess and said outwardly extending shoulders of said coupler member to disengage said handle subassembly from said coupler member.

3. A faucet handle as defined in claim 2 further comprising:
a narrow channel defined between said shoulder of said coupler member and said ribs; and
said flanges include a radially extending vertical wall at an edge thereof sized to be received in said narrow channel when said inwardly extending shoulders are positioned in said recesses.

4. A faucet handle as defined in claim 2 wherein:
said ribs comprise vertical ledges positioned radially outward from said ramps of said ribs abuttable with said shoulders of said insert member when said shoulders are rotated to be aligned with said ramps of said ribs.

5. A faucet handle as defined in claim 2 wherein:
said canted ramps abut said inwardly extending shoulders as said flanges resiliently flex inwardly to position said shoulders in said recess to move said insert member upwardly such that an upper edge of said inwardly extending shoulder is positioned higher than a lower edge of said outwardly extending shoulders thereby interlocking two sets of shoulders together.

6. A fastener device for a faucet handle assembly comprising;
a coupler member non-rotatably securable to an end of a rotatable stem;
a handle member non-rotatably securable to said coupler member;
a plurality of axially extending and resiliently flexible flanges extending from one of said coupler member and said handle member;
said flanges having radially extending shoulders;
engaging means on said other of said coupler member and said handle member for engaging said shoulders and connecting said handle member to said coupler member;
means for disconnecting said handle member from said coupler member;
said disconnecting means includes a first ramp for radially deflecting said flanges to disengage said shoulder and a second ramp for providing an axially extending sliding surface for said shoulders adjacent said engaging means for allowing said shoulders to slide past said engaging means when rotated to be aligned with said second ramp member; and
said second ramp positioned radially with respect to the flange to maintain each flange in a flexed position when said flanges are engaged thereto.

* * * * *